United States Patent
Yamagata et al.

(10) Patent No.: US 10,875,937 B2
(45) Date of Patent: Dec. 29, 2020

(54) TERMINAL-MODIFIED CONJUGATED DIENE POLYMER, RUBBER COMPOSITION AND RUBBER ARTICLE

(71) Applicant: BRIDGESTONE CORPORATION, Tokyo (JP)

(72) Inventors: Yusuke Yamagata, Tokyo (JP); Shojiro Kaita, Tokyo (JP); Shigenaga Takano, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 126 days.

(21) Appl. No.: 16/099,346

(22) PCT Filed: Apr. 27, 2017

(86) PCT No.: PCT/JP2017/016796
§ 371 (c)(1),
(2) Date: Nov. 6, 2018

(87) PCT Pub. No.: WO2017/195634
PCT Pub. Date: Nov. 16, 2017

(65) Prior Publication Data
US 2019/0153123 A1 May 23, 2019

(30) Foreign Application Priority Data
May 9, 2016 (JP) ................... 2016-094072

(51) Int. Cl.
*C08C 19/00* (2006.01)
*C08L 15/00* (2006.01)
*C08F 4/606* (2006.01)

(52) U.S. Cl.
CPC .............. *C08C 19/00* (2013.01); *C08F 4/606* (2013.01); *C08L 15/00* (2013.01)

(58) Field of Classification Search
CPC ........ C08F 36/04; C08F 36/045; C08F 36/06; C08F 36/08; C08F 4/545; C08F 4/44; C08F 4/52; C08F 4/12; C08F 36/00; C08F 2810/40; C08C 19/00
See application file for complete search history.

(56) References Cited

U.S. PATENT DOCUMENTS

| | | | | |
|---|---|---|---|---|
| 5,750,627 A * | 5/1998 | St. Clair | ................. | B05D 7/57 525/162 |
| 10,131,722 B2 * | 11/2018 | Hirata | ....................... | B60C 1/00 |
| 2004/0147694 A1 * | 7/2004 | Sone | ....................... | C08C 19/00 526/164 |
| 2005/0131174 A1 * | 6/2005 | Luo | ......................... | C08F 36/06 526/163 |
| 2005/0233894 A1 | 10/2005 | Kaita et al. | | |
| 2009/0264604 A1 * | 10/2009 | Kaita | ..................... | C08F 36/04 526/126 |
| 2014/0213721 A1 | 7/2014 | Yamada et al. | | |
| 2015/0025173 A1 | 1/2015 | Matsushita et al. | | |
| 2017/0233504 A1 | 8/2017 | Yamagata et al. | | |
| 2017/0275400 A1 * | 9/2017 | Hirata | ..................... | C08C 19/00 |
| 2019/0161571 A1 | 5/2019 | Yamagata et al. | | |

FOREIGN PATENT DOCUMENTS

| | | | | |
|---|---|---|---|---|
| CN | 103764683 A | 4/2014 | | |
| EP | 0863165 A1 | 9/1998 | | |
| EP | 2098541 A1 | 9/2009 | | |
| EP | 3184554 A1 | 6/2017 | | |
| JP | 2001-139633 A | 5/2001 | | |
| JP | 2004-027179 A | 1/2004 | | |
| JP | 2007063240 A | 3/2007 | | |
| JP | 2011-005365 A | 1/2011 | | |
| JP | 2012-180397 A | 9/2012 | | |
| JP | 2013-185057 A | 9/2013 | | |
| JP | 2014-027179 A | 2/2014 | | |
| JP | 2017-082137 A | 5/2017 | | |
| WO | 2016/027401 A1 | 2/2016 | | |
| WO | 2016/027402 A1 | 2/2016 | | |
| WO | WO-2016027401 A1 * | 2/2016 | ............. | C08F 4/545 |
| WO | 2017203830 A1 | 11/2017 | | |

OTHER PUBLICATIONS

International Search Report for PCT/JP2017/016796 dated Jun. 20, 2017 [PCT/ISA/210].
Aida, Akijiro et al., "Gadolinium or lanthanoid metallocene complexes, polymerization catalyst compositions containing them, and stereospecific addition polymerization method of dienes by employing them", Chemical Abstracts Service, Mar. 2007, pp. 1-3 (3 pages total) XP002789639.
Yamagata, Yusuke et al., "Terminally modified conjugated diene polymer, rubber composition, rubber product, and method for producing terminally modified conjugated diene polymer" Chemical Abstracts Service, Nov. 2017, pp. 1-3 (3 pages total) XP002789640.
Communication dated Mar. 29, 2019, from the European Patent Office in counterpart application No. 17795995.4.
Communication dated Mar. 12, 2020, from the State Intellectual Property Office of the P.R.C in application No. 201780028350.0.
Search Report dated Jul. 1, 2020 by the State Intellectual Property Office of the People's Republic of China in application No. 2017800283500.

* cited by examiner

*Primary Examiner* — Robert C Boyle
(74) *Attorney, Agent, or Firm* — Sughrue Mion, PLLC

(57) ABSTRACT

An object of the present disclosure is to provide a terminal-modified conjugated dime polymer capable of improving fracture resistance of a rubber article. Specifically, a terminal-modified conjugated diene polymer is characterized in that a content of catalyst residue therein derived from a catalyst used in polymerization is less than 60 ppm.

10 Claims, No Drawings

TERMINAL-MODIFIED CONJUGATED DIENE POLYMER, RUBBER COMPOSITION AND RUBBER ARTICLE

CROSS REFERENCE TO RELATED APPLICATIONS

This application is a National Stage of International Application No. PCT/JP2017/016796, filed on Apr. 27, 2017, which claims priority from Japanese Patent Application No. 2016-094072, filed on May 9, 2016.

TECHNICAL FIELD

This disclosure relates to a terminal-modified conjugated diene polymer, a rubber composition, and a rubber article.

BACKGROUND ART

Polymers having good mechanical properties such as high fracture, wear, cracking resistances, e.g. conjugated diene polymers, generally have a large molecular weight. Polymerization catalysts for use in manufacturing such a polymer have been keenly studied (for example, PTL 1).

In manufacturing such a polymer as described above, a large amount of catalyst must be charged into the polymerization reaction system in order to control molecular weight of the polymer.

CITATION LIST

Patent Literature

PTL 1: JP 2004-027179 Laid-Open

SUMMARY

An object of the present disclosure is to provide a terminal-modified conjugated diene polymer capable of improving fracture resistance of a rubber article. Further, another object of the present disclosure is to provide a rubber article having fracture resistance thus improved.

As a result of a keen study, the inventors of the present disclosure have discovered that: when such a polymer as described above is manufactured, in a case where a large amount of catalyst is charged into a system of a polymerization reaction, a large amount of catalyst residue will remain in a terminal-modified conjugated diene polymer obtained by the polymerization reaction; and, when the amount of catalyst residue in the terminal-modified conjugated diene polymer is reduced, a rubber article obtained by using the terminal-modified conjugated diene polymer with the amount of catalyst residue thus reduced exhibits significantly improved fracture resistance.

A terminal-modified conjugated diene polymer of the present disclosure is characterized in that a content of catalyst residue therein derived from a catalyst used in polymerization is less than 60 ppm. According to this feature, fracture resistance of a rubber article using the terminal-modified conjugated diene polymer improves.

In the present disclosure, a "diene polymer" represents a polymer obtained by using diene monomer as a primary component and having unsaturated hydrocarbon bonds in the main chain thereof.

In the present disclosure, the number average molecular weight (Mn) and the weight average molecular weight (Mw) are determined by the methods described in Examples.

In the present disclosure, a content of catalyst residue in a terminal-modified conjugated diene polymer or a rubber composition (the catalyst residue is derived from a catalyst used in polymerization for obtaining the terminal-modified conjugated diene polymer) is determined by measuring a content of a residual metal (e.g. aluminum, gadolinium) in the terminal-modified conjugated diene polymer or the rubber composition with elemental analysis.

In the terminal-modified conjugated diene polymer, the number average molecular weight (Mn) is preferably 100,000 or more. According to this feature, the performances of a resulting rubber article further improve.

A content of catalyst residue in the terminal-modified conjugated diene polymer of the present disclosure is preferably 30 ppm or less. According to this feature, there is obtained an effect that fracture resistance of a rubber article using the terminal-modified conjugated diene polymer further improves.

The terminal-modified conjugated diene polymer of the present disclosure is preferably at least one selected from the group consisting of terminal-modified polybutadiene, terminal-modified polyisoprene, and combination thereof.

It is preferable in the terminal-modified conjugated diene polymer that the catalyst is a polymerization catalyst composition and (1) the polymerization catalyst composition includes a rare earth element compound containing at least one nitrogen atom and a coordinative compound having a cyclopentadiene skeleton; or (2) the polymerization catalyst composition includes a compound formed by a rare earth element compound containing at least one nitrogen atom and a coordinative compound having a cyclopentadiene skeleton. According to this feature, there is obtained an effect that controllability in the polymerization improves.

A rubber composition of the present disclosure is characterized in that it contains the aforementioned terminal-modified conjugated diene polymer. According to this feature, fracture resistance of a rubber article using the rubber composition improves.

A rubber article of the present disclosure is characterized in that it uses the aforementioned rubber composition. According to this feature, fracture resistance of the rubber article improves.

According to the present disclosure, it is possible to provide a terminal-modified conjugated diene polymer capable of improving fracture resistance of a rubber article. Further, according to the present disclosure, it is possible to provide a rubber composition capable of improving fracture resistance of a rubber article. Yet further, according to the present disclosure, it is possible to provide a rubber article having fracture resistance thus improved.

DETAILED DESCRIPTION

An embodiment of the present disclosure will be described hereinafter. The following descriptions are provided only for a demonstrative purpose and do not restrict by any means the present disclosure.

<Terminal-Modified Conjugated Diene Polymer>

A terminal-modified conjugated diene polymer of the present disclosure is characterized in that a content of catalyst residue therein derived from a catalyst used in polymerization is less than 60 ppm. According to this feature, fracture resistance of a rubber article using the terminal-modified conjugated diene polymer successfully improves. Examples of a technique for setting the content of catalyst residue in the terminal-modified conjugated diene polymer to be less than 60 ppm include carrying out the polymerization for obtaining the terminal-modified conjugated diene polymer by using as the catalyst therein a polymerization catalyst composition described below.

Type of conjugated diene polymer having unmodified terminals, as a precursor of the terminal-modified conjugated diene polymer, is not particularly restricted and conventionally known conjugated diene polymers may be used.

A conventionally known conjugated diene monomer can be used as a conjugated diene monomer as a primary component of the conjugated diene polymer. Examples of the conjugated diene monomer include 1,3-butadiene, isoprene, 1,3-pentadiene, 2,3-demethyl-1,3-butadiene, 1,3-hexadiene, 1,3-cyclohexadiene, and the like.

In an embodiment, the conjugated diene polymer is a homopolymer formed by a single type of conjugated diene monomer. In another embodiment, the conjugated diene polymer is a copolymer formed by two or more types of conjugated diene monomers.

In an embodiment, the conjugated diene polymer is a polymer formed by, in addition to the conjugated diene monomer(s) as the primary component, a monomer selected from the group consisting of non-conjugated diene monomer (i.e. diene monomer in which two double bonds are separated by more than one single bond), an aromatic vinyl compound, an olefin, and a combination thereof.

A conventionally known non-conjugated diene monomer can be used as the non-conjugated diene monomer. Examples of the non-conjugated diene monomer include 1,4-hexadiene, 1,6-octadiene, 1,7-octadiene, 1,8-nonadiene, 1,9-decadiene, 2-methyl-1,5-hexadiene, 3-methyl-1,5-hexadiene, 7-methyl-1,6-octadiene, 1,4-cyclohexadiene, dicyclopentadiene, tetrahydroindene, 5-vinyl-2-norbornene, 5-ethylidene-2-norbornene, 5-methylene-2-norbornene, and the like.

A conventionally known aromatic vinyl compound can be used with no particular restriction as the aromatic vinyl compound. Examples of the aromatic vinyl compound include styrene, α-methylstyrene, p-methylstyrene, vinylnaphthalene, and the like.

A conventionally known olefin can be used with no particular restriction as the olefin. Examples of the olefin include ethylene, propylene, 1-butene, 1-pentene, 1-hexene, 1-heptene, 1-octene, and the like.

The terminal-modified conjugated diene polymer of the present disclosure is preferably at least one selected from the group consisting of terminal-modified polybutadiene, terminal-modified polyisoprene, and combination thereof.

The number average molecular weight of the terminal-modified conjugated diene polymer is not particularly restricted and may be appropriately adjusted in accordance with applications. The number average molecular weight of the terminal-modified conjugated diene polymer is 100,000 or more in an embodiment, 150,000 or more in another embodiment, and 200,000 or more in yet another embodiment. On the other hand, the number average molecular weight of the terminal-modified conjugated diene polymer is 400,000 or less in an embodiment, 350,000 or less in another embodiment, and 300,000 or less in yet another embodiment.

A molecular weight distribution (Mw/Mn) represented by a ratio of the weight average molecular weight (Mw) with respect to the number average molecular weight (Mn) of the terminal-modified conjugated diene polymer is not particularly restricted and ≤5.0 in an embodiment, ≤4.0 in another embodiment, ≤3.5 in yet another embodiment, and ≤2.0 in yet another embodiment. A molecular weight distribution (Mw/Mn)≤5.0 facilitates homogeneous distribution in terms of physical properties. A molecular weight distribution (Mw/Mn)≤4.0 is further advantageous in terms of achieving satisfactorily low hysteresis loss property.

The terminal-modified conjugated diene polymer having a gel fraction of 40% or less can be obtained, for example, by carrying out polymerization using a polymerization catalyst composition described below at low temperature (e.g. in the range of −50° C. to 100° C.) for a predetermined period of time (e.g. in the range of 30 minutes to 2 days).

When the terminal-modified conjugated diene polymer is terminal-modified polyisoprene, content of the cis-1,4 linkage thereof is not particularly restricted and may be appropriately adjusted in accordance with intended purposes. The cis-1,4 content of terminal-modified polyisoprene is ≥96% in an embodiment, ≥97% in another embodiment, and ≥99% in yet another embodiment. The cis-1,4 content ≥96%, of terminal-modified polyisoprene, ensures preferable orientation of polymer chains, thereby achieving satisfactory elongation crystallinity. Further, the cis-1,4 content ≥99%, of terminal modified polyisoprene, achieves satisfactory elongation crystallinity sufficient for obtaining higher durability.

When the terminal-modified conjugated diene polymer is terminal-modified polyisoprene, content of the trans-1,4 linkage thereof is not particularly restricted and may be appropriately adjusted in accordance with intended purposes. The trans-1,4 content of terminal-modified polyisoprene is ≤5% in an embodiment, ≤3% in another embodiment, and ≤1% in yet another embodiment. The trans-1,4 content ≤5%, of terminal-modified polyisoprene, reasonably prevents elongation crystallinity from being deteriorated.

When the terminal-modified conjugated diene polymer is terminal-modified polyisoprene, content of the 3,4-vinyl linkage thereof is not particularly restricted and may be appropriately adjusted in accordance with intended purposes. The 3,4-vinyl content of terminal-modified polyisoprene is ≤5% in an embodiment, ≤3% in another embodiment, and ≤1% in yet another embodiment. The 3,4-vinyl content ≤5%, of terminal-modified polyisoprene, reasonably prevents elongation crystallinity from being deteriorated. Terminal-modified polyisoprene having the 3,4-vinyl content thereof ≤5% can be obtained, for example, by polymerizing isoprene by using a polymerization catalyst composition described below at low temperature (e.g. in the range of −50° C. to 100° C.) for a predetermined period of time (e.g. in the range of 30 minutes to 2 days) and then modifying terminals of polyisoprene thus obtained.

The terminal-modified conjugated diene polymer is obtained by modifying terminals of copolymer of isoprene and monomer other than isoprene in an embodiment. Type of the monomer other than isoprene is not particularly restricted and examples thereof include the conjugated diene monomer, non-conjugated diene monomer, the aromatic vinyl compounds, the olefins, and combinations thereof described above. Butadiene and styrene are preferable among these examples because molecular weight control is easy in these two.

When the diene polymer is an isoprene copolymer, restrictions (and effects resulting from the restrictions) on content of the cis-1,4 linkage thereof, content of trans-1,4 linkage thereof and content of the 3,4-vinyl linkage thereof, which structures are derived from isoprene, are the same as those described above in connection with polyisoprene. It should be noted that these contents are not contents in the isoprene copolymer as a whole but contents in the portion derived from isoprene, of the copolymer.

When the terminal-modified conjugated diene polymer is terminal-modified polyisoprene, content of the portion derived from isoprene thereof is not particularly restricted and may be appropriately adjusted in accordance with intended purposes. The content of the portion derived from isoprene, of terminal-modified polyisoprene, is in the range of 5 mol % to 95 mol % in an embodiment. The content of the portion derived from isoprene ≥5 mol % ensures that the properties of isoprene will be satisfactorily demonstrated. The content of the portion derived from isoprene ≤95 mol % ensures that the properties of the copolymer component other than isoprene will be satisfactorily demonstrated.

A content of catalyst residue is preferably 30 ppm or less in the terminal-modified conjugated diene polymer of the present disclosure. According to this feature, there is obtained an effect that fracture resistance of a rubber article using the terminal-modified conjugated diene polymer further improves.

The catalyst residue in the terminal-modified conjugated diene polymer or the rubber composition of the present disclosure is residue of a rare earth element in an embodiment.

In a case where the terminal-modified conjugated diene polymer is a copolymer, type of a chain structure thereof is not particularly restricted and may be appropriately adjusted in accordance with intended purposes. Examples of the chain structure include block copolymer, random copolymer, tapered copolymer, alternating copolymer, and the like.

(Method for Preparing Terminal-Modified Conjugated Diene Polymer)

A method for preparing the terminal-modified conjugated diene polymer includes at least a polymerization process and a terminal-modifying process. The method for preparing the terminal-modified conjugated diene polymer may further optionally include a process of modifying a portion other than a terminal, a coupling process, a cleaning process, and other processes. The method for preparing the terminal-modified conjugated diene polymer does not include any cleaning processes in an embodiment.

(Polymerization Process)

The polymerization process is a process of polymerizing monomers including at least conjugated diene monomer. A conventionally known polymerization catalyst or a polymerization catalyst composition can be used in the polymerization process. In an embodiment, the polymerization process carries out polymerization of monomers including at least conjugated diene monomer under the presence of a polymerization catalyst composition.

(Polymerization Catalyst Composition)

In an embodiment, a polymerization catalyst composition includes component (A): a rare earth element compound containing at least one nitrogen atom and component (D): a coordinative compound having a cyclopentadiene skeleton. In another embodiment, the polymerization catalyst composition includes a compound formed by the component (A) and the component (D), i.e. a compound in which the component (A) is coordinated with the component (D).

When rubber (polymer) and a rubber article are industrially manufactured, it is impossible or at least difficult to thoroughly purify a polymer obtained by a polymerization reaction, i.e. thoroughly remove catalyst residue from the polymer, due to restraints in the manufacturing processes. In contrast, when polymerization is carried out by using the aforementioned polymerization catalyst composition, a polymer obtained by the polymerization reaction and a resulting terminal-modified conjugated diene polymer has a much less amount of catalyst residue therein even without being subjected to purification (the cleaning process).

In an embodiment, the polymerization catalyst composition further includes component (B): at least one of an ionic compound and a halogen compound. In another embodiment, the polymerization catalyst composition further includes at least one of an ionic compound (B-1) and a halogen compound (B-3), wherein the ionic compound (B-1) is constituted of a non-coordinative anion and a cation and the halogen compound (B-3) is at least one selected from (i) a Lewis acid, (ii) a complex compound of a metal halide and a Lewis base, and (iii) an organic compound containing an active halogen. The polymerization catalyst composition may optionally include an aluminoxane (B-2).

In an embodiment, the polymerization catalyst composition further includes component (C): a compound represented by general formula (X):

$$YR^{31}_aR^{32}_bR^{33}_c \qquad (X)$$

(In the formula (X), Y represents a metal selected from the group 1, 2, 12 and 13 elements in the periodic table, $R^{31}$ and $R^{32}$ each represent a hydrogen atom or a $C_{1-10}$ hydrocarbon group, $R^{33}$ represents a $C_{1-10}$ hydrocarbon group, a, b, and c each independently represent 0 or 1, $R^{31}$, $R^{32}$ and $R^{33}$ may be of either the same type or different types, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.)

When the polymerization catalyst composition includes at least one of the ionic compound (B-1) and the halogen compound (B-3), the polymerization catalyst composition further includes the component (C).

(Component (A))

The component (A) of the polymerization catalyst composition is a rare earth element compound containing at least one nitrogen atom. The component (A) may be either a compound containing a rare earth element and a nitrogen atom or a reaction product resulted from a reaction between the compound and a Lewis base. In the present disclosure, a "rare earth element compound" represents a compound containing an element selected from the group consisting of scandium, yttrium, and lanthanoid elements constituted of atomic number 57-71 elements in the periodic table. The lanthanoid elements include lanthanum, cerium, praseodymium, neodymium, promethium, samarium, europium, gadolinium, terbium, dysprosium, holmium, erbium, thulium, ytterbium, and lutetium.

In an embodiment, the component (A) is a rare earth element compound represented by the following general formula (i):

$$M\text{-}(NQ)^1(NQ)^2(NQ)^3 \qquad (i)$$

(In the formula, M represents at least one selected from a lanthanoid element, scandium and yttrium, and $(NQ)^1$, $(NQ)^2$ and $(NQ)^3$ each independently represent an amide group having an M-N bond.)

The rare earth element compound represented by the general formula (i) is constituted of a compound having three M-N bonds. In this case, the component (A) thus having three M-N bonds enjoys an advantage that its structure is stable because the respective M-N bonds are chemically equivalent, whereby handling of the rare earth element compound is easy. Further, in this case, the component (A) enjoys another advantage that it has no bond between the rare earth element and carbon, whereby the rare earth element compound is chemically stable and handling thereof is easy.

In the general formula (i), examples of the amide group represented by NQ include: aliphatic amide group such as dimethylamide, diethylamide, disopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tert-butylphenylamide, and the like; bistrialkylsilylamide group such as bistrimethylsilylamide; and the like.

In an embodiment, the component (A) represented by the general formula (i) is tris[N,N-bis(trimethylsilyl)amide] gadolinium (III) ($Gd[N(Si(CH_3)_3)_2]_3$).

In a case where the component (A) is a reaction product resulted from a reaction between a Lewis base and a compound containing a rare earth element and a nitrogen atom, examples of the Lewis base include tetrahydrofuran, diethyl ether, dimethylaniline, trimethylphosphine, lithium chloride, neutral olefin, neutral diolefin, and the like.

The component (A) may be used by either a single type solely or two or more types in combination.

In an embodiment, content of the component (A) contained in the polymerization catalyst composition is in the range of 0.1 mol/L to 0.0001 mol/L in the polymerization reaction system. The same content range is applicable when a compound formed by the component (A) and the component (D) is used instead of using the component (A) and the component (D) each independently. Hereinafter, any restrictions on content of the component (A) in the polymerization catalyst composition when the component (A) and the component (D) are each independently used will also applied to content of a compound formed by the component (A) and the component (D) in the polymerization catalyst composition when the compound is used in the present disclosure.

(Component (B))

The component (B) is a compound selected from the group consisting of an ionic compound and a halogen compound. In an embodiment, the component (B) is at least one compound of an ionic compound (B-1) and a halogen compound (B-3), wherein the ionic compound (B-1) is constituted of a non-coordinative anion and a cation and the halogen compound (B-3) is at least one selected from (i) a Lewis acid, (ii) a complex compound of a metal halide and a Lewis base, and (iii) an organic compound containing an active halogen. The polymerization catalyst composition may optionally include an aluminoxane (B-2) as the component (B).

(Ionic Compound (B-1))

The ionic compound (B-1) is constituted of a non-coordinative anion and a cation. Examples of the ionic compound (B-1) include an ionic compound capable of being reacted with the compound (A) to generate a cationic transition metal compound.

Examples of the non-coordinative anion include a tetravalent boron anion such as tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(trifluoromethylphenyOborate, tetra(tolyl)borate, tetra(xylyl)borate, triphenyl(pentafluorophenyOborate, [tris(pentafluorophenyl)](phenyl)borate, tridecahydride-7,8-dicarbaundecaborate, and the like.

Examples of the cation as a constituent of the ionic compound (B-1) include carbocation, oxonium cation, ammonium cation, phosphonium cation, cycloheptatrienyl cation, ferroceium cation having transition metal, and the like.

Examples of carbocation include trisubstituted carbocation such as triphenylcarbocation, tri(substituted phenyl)carbocation, and the like. Examples of the tri(substituted phenyl)carbocation include tri(methylphenyl)carbocation, tri(dimethylphenyl)carbocation, and the like.

Examples of the ammonium cation include: trialkylammonium cation such as trimethylammonium cation, triethylammonium cation, tripropylammonium cation, tributylammonium cation (e.g. tri(n-butyl)ammonium cation); N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like.

Examples of phosphonium cation include triarylphosphonium cation such as triphenylphosphonium cation, tri(methylphenyl)phosphonium cation, tri(dimethylphenyl)phosphonium cation, and the like.

Accordingly, the ionic compound (B-1) is, for example, a compound prepared by selecting a non-coordinative anion and a cation from the aforementioned examples and combining those thus selected. Specific examples of such a compound include N,N-dimethylanilinium tetrakis(pentafluorophenyl)borate, triphenylcarbonium tetrakis(pentafluorophenyl)borate, and the like.

The content of the ionic component (B-1) in the polymerization catalyst composition is 0.1 to 10 times in an embodiment, approximately 1 times in another embodiment, as much as the content of the component (A) when compared in mol.

(Aluminoxane (B-2))

The aluminoxane (B-2) is a compound obtained by bringing an organoaluminum compound into contact with a condensing agent. Examples of the aluminoxane (B-2) include a chain aluminoxane or a cyclic aluminoxane having repeating units represented by general formula: (—Al(R')O—) (in the formula, R' represents a $C_{1-10}$ organic group; some of the organic groups may have a halogen atom and/or an alkoxy group). The number of the repeating units is ≥5 in an embodiment and ≥10 in another embodiment.

In respect of the aforementioned general formula of the aluminoxane (B-2), Examples of R' include methyl, ethyl, proplyl, isobutyl groups and the like.

Examples of the organoaluminum compound used as a raw material of the aluminoxane include trialkylaluminum such as trimethylaluminum, triethylaluminum, triisobutylaluminum (TIBAL), and a mixture thereof. The organoaluminum compound is a mixture of trimethylaluminum and tributylaluminum in an embodiment.

In an embodiment, provided that "Al/M" represents an element ratio of the aluminum element Al of an aluminoxane compound with respect to the rare earth element M constituting the component (A), the content of aluminoxane (B-2) in the polymerization catalyst composition is set such that the element ratio Al/M is in the range of 10 to 1000 approximately.

(Halogen Compound (B-3))

The halogen compound (B-3) is at least one of (i) a Lewis acid, (ii) a complex compound of a metal halide and a Lewis base, and (iii) an organic compound containing an active halogen. The halogen compound (B-3) is, for example, capable of being reacted with the component (A), to generate a cationic transition metal compound, a halogenated transition metal compound, or a compound in which the center of a transition metal is electron-deficient.

A complex compound of a metal halide and a Lewis base, rather than a Lewis acid, is suitably used as the halogen compound (B-3) in terms of stability in the ambient air.

Examples of the Lewis acid of the halogen compound (B-3) include a boron-containing halogen compound such as $B(C_6F_5)_3$, an aluminum-containing halogen compound such as $Al(C_6F_5)_3$, and a halogen compound containing a group 3, 4, 5, 6 or 8 element in the periodic table. The Lewis acid is an aluminum halide or an organic metal halide and the halogen is chlorine or bromine in an embodiment.

Examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, and the like. In an embodiment, the Lewis acid is at least one of diethylaluminum chloride, ethylaluminum sesquichloride, ethylaluminum dichloride, diethylaluminum bromide, ethylaluminum sesquibromide, and ethylaluminum dibromide. When such a halogen compound as described above is used, a halogen compound containing at least two halogen atoms therein is more reactive, therefore requires less amount for use to complete a reaction, and thus is more suitably employed than a halogen compound containing only a single halogen atom therein. For example, ethylaluminum dichloride is more suitably used than diethylaluminum chloride.

In respect of a complex compound of a metal halide and a Lewis base as the halogen compound (B-3), examples of the metal halide include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, gold bromide, and the like. In an embodiment, the metal halide is selected from magnesium chloride, calcium chloride, barium chloride, manganese chloride, zinc chloride, and copper chloride. In another embodiment, the metal halide is selected from magnesium chloride, manganese chloride, zinc chloride, and copper chloride.

Examples of the Lewis base constituting the complex compound include a phosphorus compound, a carbonyl compound, a nitrogen compound, an ether compound, alcohol, and the like. Specific examples of the Lewis base include tributyl phosphate, tris (2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid, triethylamine, N,N-dimethylacetoamide, tetrahydrofuran, diphenyl ether, 2-ethyl-hexyl alcohol, oleyl alcohol, stearyl alcohol, phenol, benzyl alcohol, 1-decanol, lauryl alcohol, and the like. In an embodiment, the Lewis base is selected from tris (2-ethylhexyl) phosphate, tricresyl phosphate, acetylacetone, 2-ethyl-hexanoic acid, versatic acid, 2-ethyl-hexyl alcohol, 1-decanol, and lauryl alcohol.

Examples of the organic compound containing an active halogen as the halogen compound (B-3) include benzyl chloride.

In an embodiment, the total content of the halogen compound (B-3) in the polymerization catalyst composition is 1 to 5 times as much as the content of the component (A) when compared in mol.

The component (B) may be used by either a single type solely or two or more types in combination.

In an embodiment, the total content of the component (B) in the polymerization catalyst composition is 1 to 50 times as much as the content of the component (A) when compared in mol.

(Component (C))

In an embodiment, the polymerization catalyst composition further includes component (C) as an organometallic compound represented by the following general formula (X):

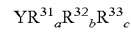

$$YR^{31}_a R^{32}_b R^{33}_c$$

(In the formula (X), Y represents a metal selected from the group 1, 2, 12 and 13 elements in the periodic table, $R^{31}$ and $R^{32}$ each represent a hydrogen atom or a $C_{1-10}$ hydrocarbon group, $R^{33}$ represents a $C_{1-10}$ hydrocarbon group, a, b, and c each independently represent 0 or 1, $R^{31}$, $R^{32}$ and $R^{33}$ may be of either the same type or different types, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.)

In an embodiment, Y in the general formula (X) represents aluminum. Examples of an organometallic compound represented by the general formula (X) and having aluminum as Y include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; hydrogenated diethylaluminum, hydrogenated di-n-propylaluminum, hydrogenated di-n-butylaluminum, hydrogenated diisobutylaluminum (DIBAL), hydrogenated dihexylaluminum, hydrogenated diisohexylaluminum, hydrogenated dioctylaluminum, hydrogenated diisooctylaluminum; ethylaluminum dihydride, n-propylaluminum dihydride, isobutylaluminum dihydride, and the like. In an embodiment, the organometallic compound represented by the general formula (X) and having aluminum as Y is selected from, for example, triethylaluminum, triisobutylaluminum, hydrogenated diethylaluminum and hydrogenated diisobutylaluminum.

The component (C) may be used by either a single type solely or two or more types in combination.

The content of an organoaluminum compound in the polymerization catalyst composition is 1 to 50 times in an embodiment, approximately 10 times in another embodiment, as much as the content of the component (A) when compared in mol.

(Component (D))

The component (D) of the polymerization catalyst composition is a coordinative compound having a cyclopentadiene skeleton.

Polymerization must be carried out under a low temperature condition in a case where the conventional co-catalyst, i.e. a compound which can serve as an anionic ligand, is used for the polymerization. In contrast, in a case where the compound (D) or a compound formed by the component (A) and the component (D) is used for polymerization, it is possible to carry out polymerization at high temperature because of high solubility and excellent stereocontrollability.

Type of the coordinative compound having a cyclopentadiene skeleton is not particularly restricted as long as it has a cyclopentadiene skeleton. However, the coordinative compound is preferably a compound having an indenyl group in terms of achieving satisfactorily high catalytic activity because it increases without use of toluene as a solvent in polymerization.

Examples of the compound having an indenyl group include indene, 1-methylindene, 1-ethylindene, 1-benzylindene, 2-phenylindene, 2-methylindene, 2-ethylindene, 2-benzylindene, 3-methylindene, 3-ethylindene, 3-benzylindene, and the like.

The polymerization catalyst composition may include a compound formed by the compound (A) and the compound (D) as described above and examples of such a compound include bis(2-phenylindenyl)gadolinium bis(dimethylsilyl amide [(2-PhC$_9$H$_6$)$_2$GdN(SiHMe$_2$)$_2$]. The compound formed by the compound (A) and the compound (D) may be used by either a single type solely or two or more types in combination.

(Preparation of Polymerization Catalyst Composition)

It is possible to prepare the polymerization catalyst composition, for example, by dissolving the components (A)-(D) in a solvent. In this respect, the order of adding the respective components is not particularly restricted. It is preferable, in terms of enhancing polymerization activity and making the polymerization initiation induction period short, to mix these components in advance so that they are preliminarily reacted with each other and aged. In this regard, the temperature for ageing is generally in the range of 0° C. to 100° C. and preferably in the range of 20° C. to 80° C. Setting the ageing temperature at 0° C. or higher facilitates sufficient ageing and setting the ageing temperature at 100° C. or lower suppresses degradation of catalytic activity, thereby reasonably ensuring a narrow distribution of molecular weight of a target polymer. A period of time for ageing is not particularly restricted and in general 30 seconds or longer is sufficient for the purpose. The composition will remain stable for a few days. Ageing can be carried out by bringing the respective components into contact with each other in a supply line prior to being fed to a polymerization reaction tank.

Examples of a solvent for use in preparation of the polymerization catalyst composition include cyclohexane, toluene, and the like. Hexane, cyclohexane or a mixture thereof are suitable for use in terms of an impact on the environment, cost and the like.

Polymerization method in the present disclosure may be any conventional polymerization method such as solution polymerization, suspension polymerization, liquid-phase bulk polymerization, emulsion polymerization, vapor-phase polymerization, or solid-phase polymerization. In a case where a solvent is used for the polymerization reaction, any solvent inactive in the polymerization reaction can be used and examples thereof include hexane, cyclohexane, toluene, a mixture thereof, and the like. Hexane, cyclohexane or a mixture thereof are suitable for use in terms of an impact on the environment, cost and the like in particular.

In a case where the conjugated diene monomer is used in the form of a monomer solution in the polymerization reaction, concentration of the monomer solution may be appropriately adjusted. The concentration of the monomer solution is, for example, in the range of 20 mass % to 70 mass %, preferably in the range of 22 mass % to 60 mass %, and more preferably in the range of 24 mass % to 50 mass %.

When the polymerization catalyst composition is used in the polymerization process, either of the following (1) and (2) will be acceptable: (1) the respective components of the polymerization catalyst composition are separately supplied to a polymerization reaction system containing the conjugated diene monomer, so that the polymerization catalyst composition is formed in the reaction system; (2) the polymerization catalyst composition which has been prepared in advance is supplied to a polymerization reaction system.

In the polymerization process, polymerization may be terminated by using a polymerization terminator such as methanol, ethanol, isopropanol, or the like.

In an embodiment, the polymerization reaction of the conjugated diene monomer is carried out under an atmosphere of inert gas such as nitrogen gas, argon gas or the like.

The polymerization temperature is not particularly restricted and in the range of −100° C. to 300° C. in an embodiment and around the room temperature in another embodiment. High polymerization temperature may adversely affect selectivity of the cis-1,4 linkage during the polymerization reaction.

Pressure during the polymerization reaction is not particularly restricted and in the range of 0.1 MPa to 10.0 MPa in terms of ensuring introducing a sufficient amount of the conjugated diene monomer into the polymerization reaction system in an embodiment.

Reaction time for the polymerization reaction is not particularly restricted and may be appropriately adjusted in accordance with conditions such as type of the catalyst, the polymerization temperature, and the like. The reaction time is in the range of 1 second to 10 days in an embodiment.

(Terminal-Modifying Process)

The method for preparing a terminal-modified conjugated diene polymer further includes a terminal-modifying process. The terminal-modifying process is a process of modifying a conjugated diene polymer obtained by the polymerization process with a modifying agent, thereby forming a terminal-modified conjugated diene polymer.

Type of the modifying agent is not particularly restricted and a conventionally known modifying agent may be appropriately selected for use. In an embodiment, the modifying agent for use in the terminal-modifying process is a compound having a functional group reactive to an active organometalllic part of the polymer to cause a substitution reaction or an addition reaction therebetween and not having an active proton which could inactivate the active organometalllic part of the polymer. A functional group thus added to the polymer as a result of the reaction between the aforementioned compound and the polymer (or occurrence of coupling) increases molecular weight of the polymer.

Examples of the representative modifying agent include a compound having at least one functional group selected from the group consisting of azacyclopropane, ketone, carboxyl, thiocarboxyl, urea, thiourea, amide, thioamide, isocyanate, thioisocyanate, halogenated isocyano, epoxy, thioepoxy, imine groups, and M-Z bond (where M represents Sn, Si, Ge or P and Z represents a halogen atom) and not having an active proton or an onium salt which could inactivate the active organometalllic parts of the polymer; carbonate; carboxylic acid anhydride; metal salt of carboxylic acid; acid halide; and the like.

In an embodiment, the modifying agent is at least one selected from the following compounds (a)-(j). In another embodiment, a modifying agent other than the modifying agent selected from the compounds (a)-(j) may be used. The modifying agent may be used by either a single type solely or two or more types in combination.

(Compound (a))

The compound (a) is a compound represented by general formula (V) shown below.

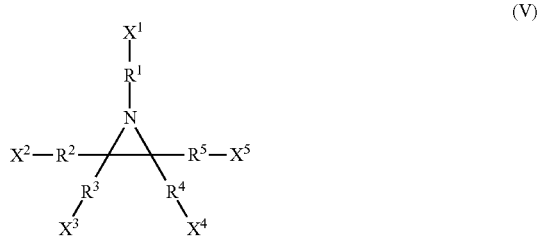

(V)

In the general formula (V), $X^1$-$X^5$ each independently represent a hydrogen atom or a monovalent $C_{1-20}$ organic group having at least one functional group selected from the group consisting of halogen atom, carbonyl, thiocarbonyl, isocyanate, thioisocyanate, epoxy, thioepoxy, halogenated silyl, hydrocarbyloxysilyl, and sulphonyloxy groups and having no active proton and no onium salt. At least one of $X^1$—$X^5$ is other than hydrogen atom.

In the general formula (V), $R^1$-$R^5$ each independently represent a single bond or a divalent $C_{1-18}$ hydrocarbon group. Examples of the divalent hydrocarbon group include $C_{1-18}$ alkylene group, $C_{2-18}$ alkenylene group, $C_{6-18}$ arylene group, $C_{7-18}$ aralkylene group, and the like. $C_{1-18}$ alkylene group, $C_{1-10}$ alkylene group in particular, is preferable among these examples. The alkylene group may be linear, branched, or cyclic and is preferably linear. Examples of the linear alkylene group include methylene, ethylene, trimethylene, tetramethylene, pentamethylene, hexamethylene, octamethylene, decamethylene groups, and the like.

A plurality of aziridine rings may be linked via any of $X^1$-$X^5$ and $R^1$-$R^5$.

In an embodiment, the general formula (V) does not allow a situation in which $X^1$ is a hydrogen atom and $R^1$ is a single bond simultaneously.

Examples of the modifying agent represented by the general formula (V) include 1-acetylaziridine, 1-propionylaziridine, 1-butyrylaziridine, 1-isobutyrylaziridine, 1-valerylaziridine, 1-isovalerylaziridine, 1-pivaloylaziridine, 1-acetyl-2-methylaziridine, 2-methyl-1-propionylaziridine, 1-butyryl-2-methylaziridine, 2-methyl-1-isobutyrylaziridine, 2-methyl-1-valerylaziridine, 1-isovaleryl-2-methylaziridine, 2-methyl-1-pivaloylaziridine, ethyl 3-(1-aziridinyl)propionate, propyl 3-(1-aziridinyl)propionate, butyl 3-(1-aziridinyl)propionate, ethylene glycol bis[3-(1-aziridinyl)propionate], trimethylolpropane tris[3-(1-aziridinyl)propionate], ethyl 3-(2-methyl-1-aziridinyl)propionate, propyl 3-(2-methyl-1-aziridinyl)propionate, butyl 3-(2-methyl-1-aziridinyl)propionate, ethylene glycol bis[3-(2-methyl-1-aziridinyl)propionate], trimethylolpropane tris[3-(2-methyl-1-aziridinyl)propionate], neopentyl glycol bis[3-(1-aziridinyl)propionate], neopentyl glycol bis[3-(2-methyl-1-aziridinyl)propionate], di(1-aziridinylcarbonyl)methane, 1,2-di(1-aziridinylcarbonyl)ethane, 1,3-di(1-aziridinylcarbonyl)propane, 1,4-di(1-aziridinylcarbonyl)butane, 1,5-di(1-aziridinylcarbonyl)pentane, di(2-methyl-1-aziridinylcarbonyl)methane, 1,2-di(2-methyl-1-aziridinylcarbonyl)ethane, 1,3-di(2-methyl-1-aziridinylcarbonyl)propane, 1,4-di(2-methyl-1-aziridinylcarbonyl)butane, and the like. The modifying agent represented by the general formula (V) is not restricted to these examples.

(Compound (b))

The compound (b) is a halogenated organometallic compound represented by general formula $R^6_a M'Z_{4-n}$ or a metal halide compound represented by general formula $M'Z_4$ or general formula $M'Z_3$ (in the general formulae, $R^6$ independently represents a $C_{1-20}$ hydrocarbon group, M' represents a tin atom, a silicon atom, a germanium atom or a phosphorus atom, Z represents a halogen atom, and n represents an integer in the range of 0 to 3).

When M' represents a tin atom, examples of the compound (b) include triphenyltin chloride, tributyltin chloride, triisopropyltin chloride, trihexyltin chloride, trioctyltin chloride, diphenyltin dichloride, dibutyltin dichloride, dihexltin dichloride, dioctyltin dichloride, phenyltin trichloride, butyltin trichloride, octyltin trichloride, tin tetrachloride, and the like.

When M' represents a silicon atom, examples of the compound (b) include triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyldichlorosilane, phenylchlorosilane, hexyltri(di)chlorosilane, octyltrichlorosilane, butyltrichlorosilane, methyltrichlorosilane, silicon tetrachloride, and the like.

When M' represents a germanium atom, examples of the compound (b) include triphenylgermanium chloride, dibutylgermanium dichloride, diphenylgermanium dichloride, butylgermanium trichloride, germanium tetrachloride, and the like.

When M' represents a phosphorus atom, examples of the compound (b) include phosphorus trichloride, and the like.

Further, it is possible to use as the modifying agent an organometallic compound having ester group or carbonyl group in a molecule thereof represented by general formula shown below.

$$R^7_n M'(-R^8—COOR^9)_{4-n}$$

$$R^7_n M'(-R^8—COR^9)_{4-n}$$

(In the formulae, $R^7$ and $R^8$ each independently represent a $C_{1-20}$ organic group, $R^9$ represents a $C_{1-20}$ organic group, a side chain may have carbonyl group or ester group. Further, the same definitions on M', Z and n as described above in connection with the general formulae $R^6_n M'Z_{4-n}$, $M'Z_4$ and general formula $M'Z_3$ are applied to M', Z and n in the formulae above, as well.)

In a case where two or more types of the compounds (b) are used in combination, the proportions of the respective types may be set as desired.

(Compound (c))

The compound (c) is a modifying agent which is a heterocumulene compound having Y=C=Y' bond in a molecule thereof.

In the formula of the compound (c), Y represents a carbon atom, an oxygen atom, a nitrogen atom, or a sulfur atom and Y' represents an oxygen atom, a nitrogen atom, or a sulfur atom.

When Y represents a carbon atom and Y' represents an oxygen atom, the compound (c) is a ketene compound. When Y represents a carbon atom and Y' represents a sulfur atom, the compound (c) is a thioketene compound. When Y represents a nitrogen atom and Y' represents an oxygen atom, the compound (c) is an isocyanate compound. When Y represents a nitrogen atom and Y' represents a sulfur atom, the compound (c) is a thioisocyanate compound. When Y and Y' each represent a nitrogen atom, the compound (c) is a carbodiimide compound. When Y and Y' each represent an oxygen atom, the compound (c) is carbon dioxide. When Y represents an oxygen atom and Y' represents a sulfur atom, the compound (c) is a carbonyl sulfide. When Y and Y' each represent a sulfur atom, the compound (c) is carbon disulfide. However, the compound (c) is not restricted to the aforementioned combinations of Y and Y'.

Examples of the ketene compound include ethylketene, butylketene, phenylketene, toluylketene, and the like.

Examples of the thioketene compound include ethylenethioketene, butylthioketene, phenylthioketene, toluylthioketene, and the like.

Examples of the isocyanate compound include phenyl isocyanate, 2,4-tolylene diisocyanate, 2,6-tolylene diisocyanate, diphenylmethane diisocyanate, diphenylmethane diisocyanate (polymeric type), hexamethylene diisocyanate, and the like.

Examples of the thioisocyanate compound include phenyl thioisocyanate, 2,4-tolylene dithioisocyanate, hexamethylene dithioisocyanate, and the like.

Examples of the carbodiimide compound include N,N'-diphenylcarbodiimide, N,N'-ethylcarbodiimide, and the like.

(Compound (d))

The compound (d) is a heterocyclic three-membered compound represented by general formula (VI) shown below.

(VI)

(In the general formula (VI), Y' represents an oxygen atom or a sulfur atom.)

When Y' represents an oxygen atom, the compound (d) is an epoxy compound. Examples of the epoxy compound include ethylene oxide, propylene oxide, cyclohexene oxide, styrene oxide, epoxidized soybean oil, epoxidized natural rubber, and the like.

When Y' represents a sulfur atom, the compound (d) is a thiirane compound. Examples of the thiirane compound include thiirane, methylthiirane, phenylthiirane, and the like.

(Compound (e))

The compound (e) is a halogenated isocyano compound having >N=C—X bond (in the formula, X represents a halogen atom).

Examples of the compound (e) include 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio) pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5-triazine, 2,4,6-trichloro-1,3,5-triazine, 2-bromo-5-nitrothiazole, 2-chlorobenzothiazole, 2-chlorobenzoxazole, and the like.

(Compound (f))

The compound (f) is a carboxylic acid represented by general formula $R^{10}$—$(COOH)_m$, or an acid halide represented by general formula $R^{11}(COZ)_m$, or an ester compound represented by general formula $R^{12}$—$(COO$—$R^{13})$, or a carbonic acid ester compound represented by general formula $R^{14}$—$OCOO$—$R^{15}$, or an acid anhydride represented by general formula $R^{16}$—$(COOCO$—$R^{17})_m$, or an acid anhydride represented by general formula (VII) shown below. In the formulae, $R^{10}$ to $R^{17}$ each independently represent a $C_{1-50}$ hydrocarbon group, Z represents a halogen atom, and m is an integer in the range of 1 to 5.

(VII)

In the general formula (VII), V represents a $C_{1-50}$ hydrocarbon group and m is an integer in the range of 1 to 5.

Examples of the carboxylic acid as the compound (f) include acetic acid, stearic acid, adipic acid, maleic acid, benzoic acid, acrylic acid, methacrylic acid, phthalic acid, isophthalic acid, telephthalic acid, trimellitic acid, pyromellitic acid, mellitic acid, polymethacrylic acid ester and products obtained by complete/partial hydrolysis thereof, and the like.

Examples of the acid halide as the compound (f) include acetic acid chloride, propyonic acid chloride, butanoic acid chloride, isobutanoic acid chloride, octanoic acid chloride, acrylic acid chloride, benzoic acid chloride, stearic acid chloride, phthalic acid chloride, maleic acid chloride, oxalic acid chloride, acetyl iodide, benzoyl iodide, acetyl fluoride, benzoyl fluoride, and the like.

Examples of the ester compound as the compound (f) include ethyl acetate, ethyl stearate, diethyl adipate, diethyl maleate, methyl benzoate, ethyl acrylate, ethyl methacrylate, diethyl phthalate, dimethyl telephthalate, tributyl trimellitate, tetraoctyl pyromellitate, hexaethyl mellitate, phenyl acetate, polymethyl methacrylate, polyethyl acrylate, polyisobutyl acrylate, and the like.

Examples of the carbonic acid ester compound as the compound (f) include dimethyl carbonate, diethyl carbonate, dipropyl carobante, dihexyl carbonate, diphenyl carbonate, and the like.

Examples of the acid anhydride as the compound (f) include: intermolecular acid anhydride such as acetic anhydride, propionic anhydride, isobutyric anhydride, isovaleric anhydride, heptanoic anhydride, benzoic anhydride, cinnamic anhydride; and intramolecular acid anhydride such as succinic anhydride, methylsuccnic anhydride, maleic anhydride, glutaric anhydride, citraconic anhydride, phthalic anhydrie, styrene-maleic anhydride copolymer, and the like.

The aforementioned compounds as examples of the compound (f) may be a coupling agent having in a molecule thereof a non-protonic polar group such as ether group, tertiary amino group, or the like, within the spirit of the present disclosure.

The compound (f) may include therein as an impurity a compound having a free hydroxyl group or an aromatic hydroxyl group.

(Compound (g))

The compound (g) is a metal salt of carboxylic acid represented by general formula $R^{19}{}_kM''(OCOR^{20})_{4-k}$, general formula $R^{21}{}_kM''(OCO-R^{22}-COOR^{23})_{4-k}$, or general formula (VIII) shown below. In the formulae, $R^{19}$ to $R^{25}$ each independently represent a $C_{1-20}$ hydrocarbon group, M'' represents a tin atom, a silicon atom or a germanium atom, k is an integer in the range of 0 to 3, and p is 0 or 1.

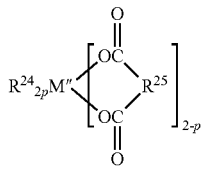

(VIII)

Examples of the metal salt of carboxylic acid represented by the general formula $R^{19}{}_kM''(OCOR^{20})_{4-k}$ include triphenyltin laurate, triphenyltin-2-ethylhexatate, triphenyltin naphthenate, triphenyltin acetate, triphenyltin acrylate, tri-n-butyltin laurate, tri-n-butyltin 2-ethylhexatate, tri-n-butyltin naphthenate, tri-n-butyltin acetate, tri-n-butyltin acrylate, tri-t-butyltin laurate, tri-t-butyltin 2-ethylhexatate, tri-t-butyltin naphthenate, tri-t-butyltin acetate, tri-t-butyltin acrylate, triisobutyltin laurate, triisobutyltin 2-ethylhexatate, triisobutyltin naphthenate, triisobutyltin acetate, triisobutyltin acrylate, triisopropyltin laurate, triisopropyltin 2-ethylhexatate, triisopropyltin naphthenate, triisopropyltin acetate, triisopropyltin acrylate, trihexyltin laurate, trihexyltin 2-ethylhexatate, trihexyltin acetate, trihexyltin acrylate, trioctyltin laurate, trioctyltin 2-ethylhexatate, trioctyltin naphthenate, trioctyltin acetate, trioctyltin acrylate, tri-2-ethylhexyltin laurate, tri-2-ethylhexyltin 2-ethylhexatate, tri-2-ethylhexyltin naphthenate, tri-2-ethylhexyltin acetate, tri-2-ethylhexyltin acrylate, tristearyltin laurate, tristearyltin 2-ethylhexatate, tristearyltin naphthenate, tristearyltin acetate, tristearyltin acrylate, tribenzyltin laurate, tribenzyltin 2-ethylhexatate, tribenzyltin naphthenate, tribenzyltin acetate, tribenzyltin acrylate, diphenyltin dilaurate, diphenyltin di-2-ethylhexatate, diphenyltin distearate, diphenyltin dinaphthenate, diphenyltin diacetate, diphenyltin diacrylate, di-n-butyltin dilaurate, di-n-butyltin di-2-ethylhexatate, di-n-butyltin distearate, di-n-butyltin dinaphthenate, di-n-butyltin diacetate, di-n-butyltin diacrylate, di-t-butyltin dilaurate, di-t-butyltin di-2-ethylhexatate, di-t-butyltin distearate, di-t-butyltin dinaphthenate, di-t-butyltin diacetate, di-t-butyltin diacrylate, diisobutyltin dilaurate, diisobutyltin di-2-ethylhexatate, diisobutyltin distearate, diisobutyltin dinaphthenate, diisobutyltin diacetate, diisobutyltin diacrylate, diisopropyltin dilaurate, diisopropyltin di-2-ethylhexatate, diisopropyltin distearate, diisopropyltin dinaphthenate, diisopropyltin diacetate, diisopropyltin diacrylate, dihexyltin dilaurate, dihexyltin di-2-ethylhexatate, dihexyltin distearate, dihexyltin dinaphthenate, dihexyltin diacetate, dihexyltin diacrylate, di-2-ethylhexyltin dilaurate, di-2-ethylhexyltin di-2-ethylhexatate, di-2-ethylhexyltin distearate, di-2-ethylhexyltin dinaphthenate, di-2-ethylhexyltin diacetate, di-2-ethylhexyltin diacrylate, dioctyltin dilaurate, dioctyltin di-2-ethylhexatate, dioctyltin distearate, dioctyltin dinaphthenate, dioctyltin diacetate, dioctyltin diacrylate, distearyltin dilaurate, distearyltin di-2-ethylhexatate, distearyltin distearate, distearyltin dinaphthenate, distearyltin diacetate, distearyltin diacrylate, dibenzyltin dilaurate, dibenzyltin di-2-ethylhexatate, dibenzyltin distearate, dibenzyltin dinaphthenate, dibenzyltin diacetate, dibenzyltin diacrylate, phenyltin trilaurate, phenyltin tri-2-ethylhexatate, phenyltin trinaphthenate, phenyltin triacetate, phenyltin triacrylate, n-butyltin trilaurate, n-butyltin tri-2-ethylhexatate, n-butyltin trinaphthenate, n-butyltin triacetate, n-butyltin triacrylate, t-butyltin trilaurate, t-butyltin tri-2-ethylhexatate, t-butyltin trinaphthenate, t-butyltin triacetate, t-butyltin triacrylate, isobutyltin trilaurate, isobutyltin tri-2-ethylhexatate, isobutyltin trinaphthenate, isobutyltin triacetate, isobutyltin triacrylate, isopropyltin trilaurate, isopropyltin tri-2-ethylhexatate, isopropyltin trinaphthenate, isopropyltin triacetate, isopropyltin triacrylate, hexyltin trilaurate, hexyltin tri-2-ethylhexatate, hexyltin trinaphthenate, hexyltin triacetate, hexyltin triacrylate, octyltin trilaurate, octyltin tri-2-ethylhexatate, octyltin trinaphthenate, octyltin triacetate, octyltin triacrylate, 2-ethylhexyltin trilaurate, 2-ethylhexyltin tri-2-ethylhexatate, 2-ehylhexyltin trinaphthenate, 2-ehylhexyltin triacetate, 2-ehylhexyltin triacrylate, stearyltin trilaurate, stearyltin tri-2-ethylhexatate, stearyltin trinaphthenate, stearyltin triacetate, stearyltin triacrylate, benzyltin trilaurate, benzyltin tri-2-ethylhexatate, benzyltin trinaphthenate, benzyltin triacetate, benzyltin triacrylate, and the like.

Examples of the metal salt of carboxylic acid represented by the general formula $R^{21}{}_kM''(OCO-R^{22}-COOR^{23})_{4-k}$ include diphenyltin bis(methylmaleate), diphenyltin bis(2-ethylhexatate), diphenyltin bis(octylmaleate), diphenyltin bis(methylmaleate), diphenyltin bis(benzylmaleate), di-n-butyltin bis(methylmaleate), di-n-butyltin bis(2-ethylhexatate), di-n-butyltin bis(octylmaleate), di-n-butyltin bis(benzylmaleate), di-t-butyltin bis(methylmaleate), di-t-butyltin bis(2-ethylhexate), di-t-butyltin bis(octylmaleate), di-t-butyltin bis(benzylmaleate), diisobutyltin bis(methylmaleate), diisobutyltin bis(2-ethylhexatate), diisobutyltin bis(octylmaleate), diisobutyltin bis(benzylmaleate), diisopropyltin bis(methylmaleate), diisopropyltin bis(2-ethylhexatate), diisopropyltin bis(octylmaleate), diisopropyltin bis(benzylmaleate), dihexyltin bis(methylmaleate), dihexyltin bis(2-ethylhexatate), dihexyltin bis(octylmaleate), dihexyltin bis(benzylmaleate), di-2-ethylhexyltin bis(methylmaleate), di-2-ethylhexyltin bis(2-ethylhexatate), di-2-ethylhexyltin bis(octylmaleate), di-2-ethylhexyltin bis(benzylmaleate), dioctyltin bis(methylmaleate), dioctyltin bis(2-ethylhexatate), dioctyltin bis(octylmaleate), dioctyltin bis(benzylmaleate), distearyltin bis(methylmaleate), distearyltin bis(2-ethylhexatate), distearyltin bis(octylmaleate), distearyltin bis(benzylmaleate), dibenzyltin bis(methylmaleate), dibenzyltin bis(2-ethylhexatate), dibenzyltin bis(octylmaleate), dibenzyltin bis(benzylmaleate), diphenyltin bis(methyladipate), diphenyltin bis(2-ethylhexatate), diphenyltin bis(octyladipate), dibenzyltin bis(benzyladipate), di-n-butyltin bis(methyladipate), di-n-butyltin bis(2-ethylhexatate), di-n-butyltin bis(octyladipate), di-n-butyltin bis(benzyladipate), di-t-butyltin bis(methyladipate), di-t-butyltin bis(2-ethylhexatate), di-t-butyltin bis(octyladipate), di-t-butyltin bis(benzyladipate), diisobutyltin bis(methyladipate), diisobutyltin bis(2-ethylhexatate), diisobutyltin bis(octyladipate), diisobutyltin bis(benzyladipate), diisopropyltin bis(methyladipate), diisopropyltin bis(2-ethylhexatate), diisopropyltin bis(octyladipate), diisopropyltin bis(benzyladipate), dihexyltin bis(methyladipate), dihexyltin bis(2-ethylhexatate), dihexyltin bis(methyladipate), dihexyltin bis(benzyladipate), di-2-ethylhexyltin bis(methyladipate), di-2-ethylhexyltin bis(2-ethylhexatate), di-2-ethylhexyltin bis (octyladipate), di-2-ethylhexyltin bis(benzyladipate), dioctyltin bis(methyladipate), dioctyltin bis(2-ethylhexatate), dioctyltin bis(octyladipate), dioctyltin bis(benzyladipate), distearyltin bis(methyladipate), distearyltin bis(2-ethylhexatate), distearyltin bis(octyladipate), distearyltin bis(benzyladipate), dibenzyltin bis(methyladipate), dibenzyltin bis(2-ethylhexatate), dibenzyltin bis(octyladipate), dibenzyltin bis(benzyladipate), and the like.

Examples of the metal salt of carboxylic acid represented by general formula (VIII) include diphenyltin maleate, di-n-butyltin maleate, di-t-butyltin maleate, diisobutyltin maleate, diisopropyltin maleate, dihexyltin maleate, di-2-ethylhexyltin maleate, dioctyltin maleate, distearyltin maleate, dibenzyltin maleate, diphenyltin adipate, di-n-butyltin adipate, di-t-butyltin adipate, diisobutyltin adipate, diisopropyltin adipate, dihexyltin diacetate, di-2-ethylhexyltin adipate, dioctyltin adipate, distearyltin adipate, dibenzyltin adipate, and the like.

(Compound (h))

The compound (h) is a N-substituted amino ketone, a N-substituted amino thioketone, a N-substituted amino aldehyde, a N-substituted amino thioaldehyde, or a compound having in a molecule thereof —C—(=M)-N< bond (where M represents an oxygen atom or a sulfur atom).

Examples of the compound (h) include: N-substituted amino ketones and N-substituted amino thioketones corresponding thereto such as 4-dimethylaminoacetophenone, 4-diethylaminoacetophenone, 1,3-bis(diphenylamino)-2-propanone, 1,7-bis(methylethylamino)-4-heptanone, 4-dimethylaminobenzophenone, 4-di-t-butylaminobenzophenone, 4-diphenylaminobenzophenone, 4,4'-bis(dimethylamino)benzophenone, 4,4'-bis(diethylamino)benzophenone, 4,4'-bis(diphenylamino)benzophenone; N-substituted amino aldehydes and N-substituted amino thioaldehydes corresponding thereto such as 4-dimethylaminobenzaldehyde, 4-diphenylaminobenzaldehyde, 4-divinylaminobenzaldehyde; a compound having in a molecule thereof —C—(=M)-N< bond (where M represents an oxygen atom or a sulfur atom), e.g. N-substituted lactams and N-substituted thiolactams corresponding thereto such as N-methyl-β-propiolactam, N-phenyl-β-propiolactam, N-methyl-2-pyrrolidone, N-phenyl-2-pyrrolidone, N-t-butyl-2-pyrrolidone, N-phenyl-5-methyl-2-pyrrolidone, N-methyl-2-piperidone, N-phenyl-2-piperidone, N-methyl-ε-caprolactam, N-phenyl-ε-caprolactam, N-methyl-ω-caprolactam, N-phenyl-ω-caprolactam, N-methyl-ω-laurylolactam, N-vinyl-ω-laurylolactam; N-substituted cyclic ureas and N-substituted cyclic thioureas corresponding thereto such as 1,3-dimethylethyleneurea, 1,3-divinylethyleneurea, 1,3-diethyl-2-imidazolidinone, 1-methyl-3-ethyl-2-imidazolidinone, 1,3-dimethyl-2-imidazolidinone; and the like.

(Compound (i))

The compound (i) is a compound having bond. Examples of the compound having N=C— bond include: an organic cyano compound represented by general formula R—CN, such as 2-cyanopyridine, 3-cyanopyridine, acrylonitrile; an electron-withdrawing compound typically represented by ketone, aldehyde and epoxy, such as benzaldehyde, benzophenone, 4-4'-bis(diethylamino)benzophenone, 3-glycidoxypropyltrimethoxysilane, allyl glycidyl ether; an organic compound having vinyl group, such as propylene, 1-butene, 1-hexene, styrene, vinylnaphthalene, vinyl phosphate, vinyl acetate ether, vinyl pivalate, vinyltrimethylsilane, triethoxyvinylsilane; and the like.

(Compound (j))

The compound (j) is a compound having a phosphate residue represented by general formula (I) shown below.

(In the formulae (I), $R^1$ and $R^2$ each independently represent a hydrogen atom or a $C_{1-20}$ linear, branched or cyclic monovalent organic group which may have a hetero atom.)

Specifically, examples of the phosphate residue represented by general formula (I) include phosphate residues represented by general formula (II) shown below.

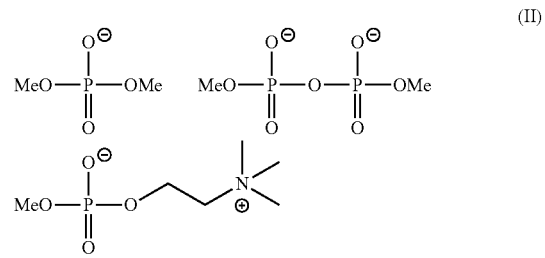

A modification reaction may be either a solution phase reaction or a solid phase reaction. The modification reaction is a solution phase reaction (a solution containing unreacted monomers used in the polymerization may be utilized) in an embodiment.

Type of the modification reaction is not particularly restricted. The modification reaction may be carried out either by using a batch-type reactor or in a continuous manner by using a device such as multi-stage continuous reactor, an inline mixer or the like. The modification reaction is carried out preferably after the completion of the polymerization reaction and before solvent removal, water processing, heat treatment, and operations required for separation of the polymer.

Temperature in the modification reaction may be set in accordance with the polymerization temperature of the conjugated diene polymer, for example, to be in the range of 20° C. to 100° C. The temperature 20° C. can suppress an increase in viscosity of the polymer. The temperature 100° C. can suppress inactivation of active terminals of the polymer.

Content of the modifying agent for use, with respect to the component (A) of the polymerization catalyst composition, may be adjusted in accordance with a desired terminal modification rate of the modified polymer and is in a mole ratio preferably in the range of 0.1 to 100, more preferably in the range of 1.0 to 50. It is possible to facilitate the modification reaction and obtain a polymer which does not generate an insoluble component (gel) in an organic solvent such as toluene and is excellent in low heat generation property and wear resistance by setting the content of the modifying agent for use to be within the aforementioned ranges.

The modification reaction may be carried out generally at temperature in the range of the room temperature to 100° C. with stirring in a period preferably in the range of 30 seconds to 2 hours, more preferably in the range of 3 minutes to 1 hour. It is possible to obtain a diene polymer having a high terminal modification rate by carrying out polymerization under the catalyst and polymerization conditions for achieving a high terminal-living rate and then a subsequent terminal modification reaction.

It suffices that at least one terminal of the terminal-modified conjugated diene polymer, in a molecule thereof, is modified. One terminal of the terminal-modified conjugated diene polymer in a molecule thereof has been modified in an embodiment. Both terminals of the terminal-modified conjugated diene polymer in a molecule thereof have been modified in another embodiment.

The terminal modification rate is preferably 70% in the terminal-modified conjugated diene polymer of the present disclosure. This feature effectively improves the low fuel consumption property and durability of a resulting rubber article.

In the terminal-modified conjugated diene polymer of the present disclosure, portions thereof other than the terminals may be modified by the modification reaction in the terminal-modifying process described above and/or another conventional, known modification reaction such as a graft reaction.

When the terminal-modified conjugated diene polymer of the present disclosure has a high modification rate, the low heat generation property of a resulting rubber article improves.

(Coupling Process)

The coupling process may optionally be carried out in an embodiment of the method for preparing the terminal-modified conjugated diene polymer. The coupling process involves coupling at least a portion (e.g. a terminal) of two or more polymer chains of the conjugated diene polymers or the terminal-modified conjugated diene polymers with a coupling agent. The coupling reaction is carried out when the polymerization reaction has 100% completed in an embodiment.

Type of the coupling agent is not particularly restricted and may be appropriately selected in accordance with intended purposes. Examples of the coupling agent include: (i) a tin-containing compound such as bis(maleic acid-1-octadecyl)dioctyltin (IV); (ii) an isocyanate compound such as 4,4'-diphenylmethane diisocyanate; and (iii) an alkoxysilane compound such as glycidylpropyltrimethoxysilane; and the like. Bis(maleic acid-1-octadecyl)dioctyltin (IV) is preferable in terms of high reaction efficiency and low gel generation among these examples. The coupling agent may be used by either a single type solely or two or more types in combination.

Reaction temperature during the coupling reaction is not particularly restricted and may be appropriately selected in accordance with intended purposes. The reaction temperature is in the range of 10° C. to 100° C. in an embodiment and in the range of 20° C. to 80° C. in another embodiment. The reaction temperature 10° C. suppresses a significant decrease in a reaction rate. The reaction temperature 100° C. suppresses gelling of the polymer.

Reaction time of the coupling reaction is not particularly restricted and may be appropriately selected in accordance with intended purposes. The reaction time is in the range of 10 minutes to 1 hour in an embodiment. The reaction time 10 minutes ensures satisfactory development of the reaction. The reaction time 1 hour suppresses gelling of the polymer.

(Cleaning Process)

The cleaning process may optionally be carried out in an embodiment of the method for preparing the terminal-modified conjugated diene polymer. The cleaning process involves cleaning the conjugated diene polymer or the terminal-modified conjugated diene polymer with a solvent and removing catalyst residue or the like therefrom, thereby purifying the conjugated diene polymer/the terminal-modified conjugated diene polymer. Type of the solvent for use in cleaning is not particularly restricted and may be appropriately selected in accordance with intended purposes. Examples of the solvent include methanol, ethanol, isopropanol, and the like.

In a case where a catalyst derived from Lewis acid is used as the polymerization catalyst, the solvent for use in the cleaning process may be used in combination with acid such as hydrochloric acid, sulfuric acid, and nitric acid. An amount of the acid to be added is 15 mol % with respect to the solvent in an embodiment. Setting the content of the acid to be 15 mol % with respect to the solvent reasonably prevents the acid from remaining in the terminal-modified conjugated diene polymer.

(Rubber Composition)

A rubber composition of the present disclosure is characterized in that it contains the terminal-modified conjugated diene polymer described above, whereby it is possible to provide a rubber composition capable of improving fracture resistance and low-heat generation property. Additives conventionally for use in manufacturing a rubber article such as a tire may be added, in addition to the terminal-modified conjugated diene polymer, to the rubber composition. Examples of such additives include fillers such as carbon black, silica and the like, crosslinking agent, vulcanization accelerator, softening agent, vulcanization auxiliary, coloring agent, flame retardant, lubricant, foaming agent, plasticizer, processing aid, antioxidant, ageing inhibitor, scorch-preventing agent, ultraviolet absorber, antistatic agent, anti-coloring agent, and the like.

(Crosslinked Rubber)

Crosslinked rubber can be obtained for use by subjecting the rubber composition to crosslinking. The crosslinking conditions are not particularly restricted and may be appropriately selected in accordance with intended purposes. The crosslinking conditions are temperature: 120° C. to 200° C. and heating period: 1 minute to 900 minutes in an embodiment.

<Rubber Article>

A rubber article of the present disclosure is characterized in that the rubber article uses the rubber composition described above, whereby it is possible to provide a rubber article of which fracture resistance has improved. The aforementioned definition that "the rubber article uses the rubber composition" encompasses a case where the rubber article uses a crosslinked rubber obtained by subjecting the rubber composition to crosslinking. Type of the rubber article is not particularly restricted and examples of the rubber article include those conventionally known such as a rubber member like tread, base tread, sidewalls, side reinforcing rubber, bead filler; tire; vibration damper rubber; base-isolation rubber; belt (conveyer belt); rubber crawler; various types of hoses; and the like. A method for manufacturing the rubber article is not particularly restricted and the aforementioned rubber composition can be used in place of the conventional rubber composition when a rubber article is manufactured.

EXAMPLES

The present disclosure will be described further in detail by Examples hereinafter. These Examples are provided only for a demonstrative purpose and do not limit the present disclosure by any means.

Details of the materials used in the Examples are as follows.

Aluminoxane: Product name "MMAO-3A" manufactured by Tosoh Finechem Corporation
Polymerization terminator (2,2'-methylene-bis(4-ethyl-6-t-butylphenol)): Product name "Nocrac NS-5" manufactured by Ouchi-Shinko Chemical Industrial Co., Ltd.
Carbon black: Product name "DIABLACK® N234" manufactured by Mitsubishi Chemical Corporation
Antioxidant (N-phenyl-N'-(1,3-dimethylbutyl)-p-phenylenediamine): Product name "Nocrac 6C" manufactured by Ouchi-Shinko Chemical Industrial Co., Ltd.
Wax: Microcrystalline wax, Product name "SUNTIGHT®S" manufactured by Seiko Chemical Co., Ltd.
Vulcanization accelerator 1: 1,3-diphenylguanidine, Product name "Nocceler D" manufactured by Ouchi-Shinko Chemical Industrial Co., Ltd.
Vulcanization accelerator 2: Di-2-benzothiazolyl disulfide, Product name "Nocceler DM-P" manufactured by Ouchi-Shinko Chemical Industrial Co., Ltd.
Vulcanization accelerator 3: N-tert-butyl-2-benzothiazolylsulfenamide, Product name "Nocceler NS-P" manufactured by Ouchi-Shinko Chemical Industrial Co., Ltd.

Example 1

A monomer solution was prepared by adding 300 mL of hexane solution containing 100 g of 1,3-butadiene in a nitrogen-substituted, completely dry pressure-resistant glass reactor (1000 mL).

On the other hand, a catalyst solution was prepared by: mixing 30 μmol of bis(2-phenylindenyl) gadolinium-bis(dimethylsilylamide) [(2-PhC$_9$H$_6$)$_2$GdN(SiHMe$_2$)$_2$], 60 μmol of 1-benzylindene, 8.4 mmol of triisobutylaluminum (TIBAL), and 4.8 mmol of hydrogenated diisobutylaluminum (DIBAL) in a glass vessel in a glove box under a nitrogen atmosphere and leaving the mixture therein for 12 hours; then adding 1.87 mL of MMAO-3A to the mixture and leaving the solution for 6 hours; thereafter adding 40 μL of diethylaluminum chloride (DEAC) to the solution, thereby obtaining a catalyst solution.

Next, a sample polymer was prepared by: collecting the catalyst solution from the glove box; adding an amount of the catalyst solution, equivalent to 4 μmol in terms of gadolinium, to the monomer solution, to carry out polymerization at 50° C. for 15 minutes; after the polymerization, adding a modifying agent to the mixture and allowing a modification reaction to proceed for 1 hour; then adding 1 mL of isopropanol solution containing Nocrac NS-5 (5 mass %) to the mixture to terminate the reaction; separating the polymer by adding a large amount of isopropanol and vacuum-drying the polymer thus separated at 60° C., thereby obtaining polymer A of which terminals had been modified. The yield of the polymer A thus obtained was 40 g.

Example 2

Example 2 was conducted by carrying out a polymerization reaction, a modification reaction and other processes thereafter in the same manner as Example 1, except that isoprene was used instead of 1,3-butadiene in Example 2. Polymer B of which terminals had been modified was obtained. The yield of the polymer B thus obtained was 40 g.

Comparative Example 1

Product name "JSR BR01" (polybutadiene rubber) manufactured by JSR Corporation was used as a conjugated diene polymer of Comparative Example 1.

Number average molecular weight (Mn), molecular weight distribution (Mw/Mn), content of the cis-1,4 linkage, terminal modification rate, and content of catalyst residue were measured for each of the polymers of Examples 1 and 2 by the methods described below. The results are shown in Table 1.

(Number Average Molecular Weight (Mn) and Molecular Weight Distribution (Mw/Mn))

The number average molecular weight (Mn) and the molecular weight distribution (Mw/Mn) in terms of polystyrene (with monodispersed polystyrene as the reference) of each sample polymer were obtained, respectively, through measurement at the room temperature by gel permeation chromatography [GPC: product name "HLC-8020" manufactured by TOSOH CORPORATION, Column: product name "GMH-XL" manufactured by TOSOH CORPORATION, Eluent: tetrahydrofuran] using a differential refractometer as a detector.

(Cis-1,4 Linkage Content (Microstructure))

Cis-1,4 linkage content was calculated based on the integration ratios of peaks [$^1$H-NMR: δ 4.6-4.8 (representing =CH$_2$ of the 3,4-vinyl unit), 5.0-5.2 (representing —CH= of the 1,4-unit), $^{13}$C-NMR: 823.4 (representing 1,4-cis unit), 15.9 (representing 1,4-trans unit), 18.6 (representing 3,4-unit)] obtained by $^1$H-NMR and $^{13}$C-NMR.

(Terminal Modification Rate)

Terminal modification rate was measured by a method described in WO 2006/112450.

(Content of catalyst residue)

Content of catalyst residue (content of metal residue) was measured by elemental analysis.

TABLE 1

|  | Example 1 Polymer A | Example 2 Polymer B |
|---|---|---|
| Mn (×10$^3$) | 156 | 558 |
| Mw/Mn | 1.92 | 1.83 |
| Cis-1,4 linkage content (%) | 98.6 | 99.4 |
| Terminal modification rate (%) | 82 | 70 |
| Content of catalyst residue (ppm) | 27 | 29 |

Test rubber compositions of Example 1 and Comparative Example 1 were prepared, respectively, according to the formulation shown in Table 2. Low hysteresis loss property and fracture resistance were evaluated for each of the test rubber compositions thus obtained as described below.

(Evaluation of Low Hysteresis Loss Property)

Low hysteresis loss property was evaluated by: subjecting the test rubber composition to vulcanization process at 160° C. for 20 minutes, to obtain test rubber; measuring loss tangent (tan δ) of the test rubber by using a spectrometer manufactured by Toyo Seiki Seisaku-sho, Ltd. under the conditions of initial load: 100 g, strain: 2%, measurement frequency: 50 Hz, and measurement temperature: 25° C. and 60° C.; and expressing each of the loss tangent (tan δ) values of Examples 1 and 2 by an index relative to the tan δ value of Comparative Example 1 being "100". The results are shown in Table 2. The smaller index value represents the better results, i.e. the lower hysteresis loss.

(Evaluation of Fracture Resistance)

Fracture resistance was evaluated by: preparing a test tire by using the test rubber composition as rubber for tread; measuring tensile strength of the ring-shaped rubber according to JIS K 6251:2010; and expressing each of the tensile strength values of Examples 1 and 2 by an index relative to the tensile strength value of Comparative Example 1 being "100". The results are shown in Table 2. The larger index value represents the higher fracture resistance.

TABLE 2

| | | Example 1 | Example 2 | Comp. Example 1 |
|---|---|---|---|---|
| Formulation of rubber composition (parts by mass) | Polymer | Polymer A 100 | Polymer B 100 | JSR BR01 100 |
| | Carbon black | 50 | 50 | 50 |
| | Stearic acid | 2.0 | 2.0 | 2.0 |
| | Antioxidant | 1 | 1 | 1 |
| | Wax | 2 | 2 | 2 |
| | Zinc white | 5.0 | 5.0 | 5.0 |
| | Vulcanization accelerator 1 | 1.0 | 1.0 | 1.0 |
| | Vulcanization accelerator 2 | 2.0 | 2.0 | 2.0 |
| | Vulcanization accelerator 3 | 0.5 | 0.5 | 0.5 |
| | Sulfur | 1.0 | 1.0 | 1.0 |
| Evaluation | Low hysteresis loss property | 76 | 99 | 100 |
| | Fracture resistance | 138 | 200 | 100 |

INDUSTRIAL APPLICABILITY

According to the present disclosure, it is possible to provide a terminal-modified conjugated diene polymer capable of improving fracture resistance of a rubber article. Further, according to the present disclosure, it is possible to provide a rubber composition capable of improving fracture resistance of a rubber article. Yet further, according to the present disclosure, it is possible to provide a rubber article having fracture resistance thus improved.

The invention claimed is:

1. A terminal-modified conjugated diene polymer, wherein a content of catalyst residue therein derived from a catalyst used in polymerization is less than 30 ppm,
   wherein the catalyst is a polymerization catalyst composition and
   (1) the polymerization catalyst composition includes tris[N,N-bis(trimethylsilyl)amide]gadolinium (III) and 1-benzylindene; or
   (2) the polymerization catalyst composition includes bis(2-phenylindenyl)gadolinium bis(dimethylsilyl amide).

2. The terminal-modified conjugated diene polymer of claim 1, wherein the number average molecular weight (Mn) thereof is 100,000 or more.

3. The terminal-modified conjugated diene polymer of claim 1, wherein the terminal-modified conjugated diene polymer is at least one selected from the group consisting of terminal-modified polybutadiene, terminal-modified polyisoprene, and combination thereof.

4. A rubber composition, containing the terminal-modified conjugated diene polymer of claim 1.

5. A rubber article, using the rubber composition of claim 4.

6. The terminal-modified conjugated diene polymer of claim 1, wherein the polymerization catalyst composition further includes a halogen compound (B-3).

7. The terminal-modified conjugated diene polymer of claim 1, wherein the polymerization catalyst composition further includes an aluminoxane (B-2) and a halogen compound (B-3).

8. The terminal-modified conjugated diene polymer of claim wherein the polymerization catalyst composition further includes, as component (C), two or more types of a compound represented by the following general formula (X):

$$AlR^{31}R^{32}R^{33} \qquad (X)$$

wherein $R^{31}$ and $R^{32}$ represent a hydrogen atom or a $C_{1-10}$ hydrocarbon group, $R^{33}$ represents a $C_{1-10}$ hydrocarbon group, $R^{31}$, $R^{32}$ and $R^{33}$ may be of either the same type or different types.

9. The terminal-modified conjugated diene polymer of claim 8, wherein the component (C) is triisobutylaluminum and hydrogenated diisobutylaluminum.

10. The terminal-modified conjugated diene polymer of claim 2, wherein the terminal-modified conjugated diene polymer is at least one selected from the group consisting of terminal-modified polybutadiene, terminal-modified polyisoprene, and combination thereof.

* * * * *